United States Patent [19]
Guadagni et al.

[11] 3,829,582
[45] Aug. 13, 1974

[54] METHOD OF IMPARTING FATTY-FRIED FLAVOR TO FOODS AND COMPOSITION

[75] Inventors: Dante G. Guadagni, Moraga; Ron G. Buttery, Richmond, both of Calif.

[73] Assignee: The United States of America as represented by the Secretary of Agriculture, Washington, D.C.

[22] Filed: Sept. 21, 1972

[21] Appl. No.: 290,932

[52] U.S. Cl. .................. 426/65, 426/808, 426/175
[51] Int. Cl. ............................................. A23l 1/26
[58] Field of Search ..................................... 426/65

[56] References Cited
OTHER PUBLICATIONS

Mookherjee et al., J. Agr. Food Chem., Vol. 13, No. 2, Mar. – Apr. 1965, pp. 131–134.

Buttery et al., J. Agr. Food Chem., Vol. 19, No. 5, 1971, pp. 969–971.

Buttery et al., J. Agr. Food Chem., Vol. 20, No. 3, 1972, pp. 698–700.

*Primary Examiner*—Joseph M. Golian
*Attorney, Agent, or Firm*—M. Howard Silverstein; W. Takacs; R. Hoffman

[57] ABSTRACT

A mixture containing methional, 2-acetylthiazoline, deca-2,4-dienal, 2-octenal, 2-acetyl-1,4,5,6-tetrahydropyridine, 2-ethyl-3,6-dimethylpyrazine, 2,6-diethylpyrazine, and 2-phenylacetaldehyde is used to impart a fatty-fried flavor to potato and other food products.

4 Claims, No Drawings

METHOD OF IMPARTING FATTY-FRIED FLAVOR TO FOODS AND COMPOSITION

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of a new method for imparting or enhancing fatty-fried flavor in potato and other food products. Further objects of the invention will be evident from the following description wherein parts and proportions are by weight unless otherwise specified. The terms "fat" and "oil" are used synonymously herein as designating an edible glyceride, whether normally solid or liquid.

In the preparation of potato chips, French fries, and the like, a conventional step is to fry potato pieces in hot fat. This frying operation develops in the product a desirable fatty-fried aroma and taste. However, it yields a product with a high oil content. This is a disadvantage to both the processor and the consumer. For the processor, it means excessive operating costs in expending large quantities of oil. For the consumer it means that the nutritive value of the food is offset by a too high fat content. To obtain a given quantity of protein, starch, and sugar, or other non-fat nutrient in addition to a pleasing flavor, the consumer necessarily receives a high proportion of fat. This in turn limits the consumption of fried potato products, especially chips, in that persons on fat-restricted diets or for other medical reasons cannot consume fried potato products or at least can consume them only in very limited quantities. Another disadvantage of conventional fried potato products is that much of the oil is in the surface layers of the products so that they leave oily smears on everything they contact, such as fingers, plates, cutlery, etc. This is another deterrent to the consumption of fried foods; many persons find them too messy to be served at anything other than informal occasions such as picnics, fairs, or other outdoor gatherings.

A primary object of the invention is the provision of means for obviating the above problems. By application of the invention one can readily prepare potato products having a desirable fatty-fried flavor without application of oil, or with a reduced content of oil.

Another advantage of the invention is that the appearance and texture of the product is improved. The product no longer looks or feels greasy or oily. In addition, low fat content means that the product will be more stable to oxygen. Resistance to oxidative deterioration (rancidity) means a longer shelf-life for the material.

Still another advantage of the invention is that sanitation during the preparation of potato products becomes less difficult. Oil can contaminate equipment, packaging material, and general work areas. Less oil means fewer work stoppages for cleaning purposes and therefore more productivity.

In the present description emphasis is directed to formation of low-fat or no-fat potato chips. Reference to such particular material is, however, by way of illustration and not limitation. In its broad ambit the invention is applicable to all potato products, such as French fries, shoestring potatoes, mashed potato products, dehydrated potatoes, and the like, and to other foods in which a fatty-fried flavor is desired.

In accordance with the invention the impartation of fatty-fried potato chip flavor is accomplished by incorporating with the chip a unique mixture containing the following compounds: methional, 2-acetylthiazoline, deca-2,4-dienal, 2-octenal, 2-acetyl-1,4,5,6-tetrahydropyridine, 2-ethyl-3,6-dimethylpyrazine, 2,6-diethylpyrazine, and 2-phenylacetaldehyde. Generally, these compounds are employed in the following proportion: 4:23:1:19:16:23:9:5, respectively. However, the content of each component may vary by as much as 20%. It should be remembered, however, that excessive variation changes the flavor and aroma of the mixture. Hereinafter, the mixture of the invention will be referred to as PCF (potato chip flavor). It should be noted that the odor or flavor of any component of PCF taken individually does not resemble that of either potato chips or PCF. Rather, it is the unique combination of these components in the above-mentioned proportions which produces the desired fatty-fried potato chip flavor and aroma.

The components of PCF have the following structures:

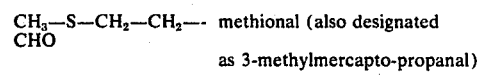

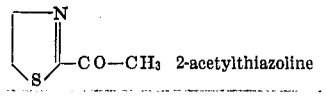

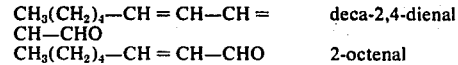

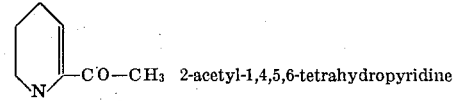

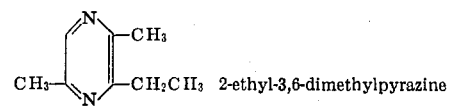

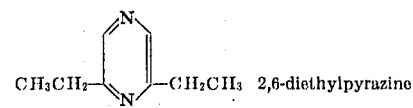

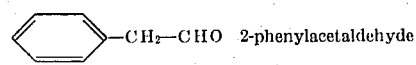

In using PCF as a flavoring agent to produce no-fat or low-fat potato chips, one may proceed in a number of ways. For example, potatoes are sliced and water removed by application of hot air, microwave, or other drying technique. Next, PCF is applied in an inert liquid carrier, such as water, ethyl alcohol, glycerol, or edible fats or oils. Usually, the concentration of PCF in the carrier is 0.05 to 0.5% and the solution is applied to obtain a concentration on the surface of the chip of approximately 0.1%. Higher concentrations give a more intense potato chip flavor. It is obvious, however, that there is nothing critical about the concentration which is used; it is simply a matter of attaining a desired flavor level appropriate to the food in question. Spraying the mixture onto the potato surface affords a convenient method of obtaining even flavoring. However, other methods of applying PCF can be used. To this end PCF may be mixed with salt and the mixture applied to the surface of the chip as one would apply salt itself.

Following the application of PCF the potato chip is given a final treatment to develop the color of fried chips. This can be accomplished by subjecting the chip to hot air or infrared rays or, for low-fat chips, by dipping the chip briefly in hot oil.

A preferred method for producing potato chips flavored with PCF is the following: Dehydrated potato flakes are made into a dough by the addition of water or milk; other conventional ingredients such as starch may be added at this time. Next, PCF is incorporated therewith. PCF may be added directly to the dough, or it may first be incorporated with a diluent to increase its bulk so that small amounts of the mixture may be accurately metered into the food. As the diluent one may use either one of the aforementioned liquid carriers or a solid carrier, such as starch, sorbitol, salt, sugar, gelatin, flour, citric acid, powdered skim milk, corn syrup solids, or other non-toxic substances compatible with the material to be flavored. In general, adequate flavoring can be attained by employing only a very minor proportion of PCF, for example, in a concentration 0.05 to 1.0 parts per million parts of dough. To obtain a stronger flavor a higher proportion of PCF may be incorporated in the dough. The flavored dough is then formed into chips or other desired shapes, which are then dried, and color developed as described above. By incorporating PCF in the dough one can obtain products that are flavored throughout, rather than only on the surface.

The aforementioned examples of applying the invention are merely illustrative. Other methods of flavoring potato chips with PCF will be suggested to those skilled in the art.

A particular advantage of the invention is that potatoes with high sugar content can be employed to make chips. Generally, if sugar content is too high, an undesirable dark brown color is obtained when the chip is fried in hot oil. Since the invention obviates frying the chip in hot oil, potatoes with high sugar content can be put to use rather than be discarded.

Another advantage of PCF is that its flavor and aroma are superior to that of commercial imitation potato-chip flavoring compounds.

Although PCF has a fatty-fried potato chip flavor, its presence in potato chips has never been demonstrated. In addition, as mentioned earlier, the individual components which comprise PCF do not exhibit the flavor or aroma of potato chips. It is the unique combination of these components that is essential to the invention.

The invention is further demonstrated by the following illustrative examples. Parts of the examples are not illustrative of the invention but are provided simply for purposes of comparison.

EXAMPLE 1

Average Odor Similarity Scores for PCF, Crushed Chips, and IM to Specific Odor Descriptions The components of PCF were obtained from reliable commercial sources or were synthesized by well-established procedures. All compounds were purified by preparative gas-liquid chromatography before use.

A mixture of 0.4 mg. methional, 2.3 mg. 2-acetylthiazoline, 0.1 mg. deca-2,4-dienal, 1.9 mg. 2-octenal, 1.6 mg. 2-acetyl-1,4,5,6-tetrahydropyridine, 2.3 mg. 2-ethyl-3,6-dimethylpyrazine, 0.9 mg. 2,6-diethylpyrazine, and 0.5 mg. 2-phenylacetaldehyde in 100 ml. of high-oleic safflower oil was prepared. Sensory examination of this oil at room temperature revealed no background odor. A "Kleenex" tissue was saturated with the above solution and placed in a 125-ml. glass-stoppered Erlenmeyer flask. Crushed potato chips were placed in another similar flask and covered with tissue. Finally, a commercial sample of imitation potato chip flavor (IM) was prepared and in a third flask as above. All flasks were covered with paper on the outside to conceal the contents.

The aroma in each flask was evaluated by a panel of twenty experienced judges. Each judge was given all three flasks simultaneously and asked to rate the similarity of the odors to a list of ten descriptive words or phrases on an 8-point scale ranging from "not similar" (0) to "extremely similar" (8). The average scores listed below are based on seven replications.

| Material | Similarity of odors to specific odor descriptions* | | |
|---|---|---|---|
| | Fresh chips | Fatty-fried | Stale chips |
| PCF | 2.2 | 1.4 | 1.5 |
| IM | 1.6 | 0.7 | 1.0 |
| Crushed chips | 3.5 | 0.9 | 0.9 |

*8 - Extremely similar
6 - Very similar
4 - Moderately similar
2 - Slightly similar
0 - Not similar

EXAMPLE 2

Direct Comparisons of PCF, Crushed Chips, and IM According to Freshest Potato Chip Aroma All samples were in flasks as described in Example 1. PCF was rated directly against crushed chips and against the commercial imitation potato chip flavor (IM). Judges were asked to select the sample with the freshest chip aroma. Results are tabulated below.

| Comparison | Replication | N* | Freshest chip aroma | |
|---|---|---|---|---|
| | | | 1st sample | 2nd sample |
| PCF vs. IM | 1 | 25 | 24 | 1 |
| | 2 | 21 | 17 | 4 |
| | 3 | 21 | 19 | 2 |
| | | 67 | 60 | 7 |
| Crushed chips vs. PCF | 1 | 25 | 19 | 6 |
| | 2 | 21 | 14 | 7 |
| | 3 | 26 | 18 | 8 |
| | | 72 | 51 | 21 |

| Comparison | Replication | N* | Freshest chip aroma 1st sample | 2nd sample |
|---|---|---|---|---|
| Crushed chips vs. IM | 1 | 25 | 25 | 0 |
| | 2 | 21 | 20 | 1 |
| | 3 | 26 | 21 | 5 |
| | | 72 | 66 | 6 |

* N = number of judges

Having thus described our invention, We claim:

1. A composition of matter, useful for imparting a fatty-fried potato chip flavor to foods, which consists of

| Ingredient | Parts by weight |
|---|---|
| methional | 3–5 |
| 2-acetylthiazoline | 18–28 |
| deca-2,4-dienal | 0.8–1.2 |
| 2-octenal | 15–23 |
| 2-acetyl-1,4,5,6-tetrahydropyridine | 13–19 |
| 2-ethyl-3,6-dimethylpyrazine | 18–28 |
| 2,6-diethylpyrazine | 7–11 |
| 2-phenylacetaldehyde | 4–6 |

2. A method for imparting fatty-fried potato chip flavor to a food product, which comprises adding to the food product a mixture consisting of:

| Ingredient | Parts by weight |
|---|---|
| methional | 3–5 |
| 2-acetylthiazoline | 18–28 |
| deca-2,4-dienal | 0.8–1.2 |
| 2-octenal | 15–23 |
| 2-acetyl-1,4,5,6-tetrahydropyridine | 13–19 |
| 2-ethyl-3,6-dimethylpyrazine | 18–28 |
| 2,6-diethylpyrazine | 7–11 |
| 2-phenylacetaldehyde | 4–6 | said mixture being added in an amount effective to impart a fatty-fried potato chip flavor to the food.

3. A composition of (a) a food and (b) an added mixture consisting of

| Ingredient | Parts by weight |
|---|---|
| methional | 3–5 |
| 2-acetylthiazoline | 18–28 |
| deca-2,4-dienal | 0.8–1.2 |
| 2-octenal | 15–23 |
| 2-acetyl-1,4,5,6-tetrahydropyridine | 13–19 |
| 2-ethyl-3,6-dimethylpyrazine | 18–28 |
| 2,6-diethylpyrazine | 7–11 |
| 2-phenylacetaldehyde | 4–6 | said mixture being present in an amount effective to impart a fatty-fried potato chip flavor to the food.

4. The composition of claim 3 which contains the said mixture in a concentration of 0.05 to 1.0 parts per million.

* * * * *